(12) United States Patent
Mueller et al.

(10) Patent No.: US 10,873,115 B2
(45) Date of Patent: Dec. 22, 2020

(54) HOUSING FOR ACCOMMODATION OF A PLURALITY OF BATTERY CELLS HAVING A COOLING DEVICE INTEGRATED IN THE HOUSING

(71) Applicant: Robert Bosch GmbH, Stuttgart (DE)

(72) Inventors: Carsten Mueller, Stuttgart (DE); Lisa Lorenz, Stuttgart (DE); Ruben Jung, Stuttgart (DE); Sandro Rank, Stuttgart (DE); Jens Boehme, Gerlingen (DE); Johannes Federle, Rottenburg (DE)

(73) Assignee: Robert Bosch GmbH, Stuttgart (DE)

( * ) Notice: Subject to any disclaimer, the term of this patent is extended or adjusted under 35 U.S.C. 154(b) by 673 days.

(21) Appl. No.: 15/325,429

(22) PCT Filed: Jun. 9, 2015

(86) PCT No.: PCT/EP2015/062848
§ 371 (c)(1),
(2) Date: Jan. 10, 2017

(87) PCT Pub. No.: WO2016/005131
PCT Pub. Date: Jan. 14, 2016

(65) Prior Publication Data
US 2017/0187083 A1 Jun. 29, 2017

(30) Foreign Application Priority Data

Jul. 11, 2014 (DE) .................... 10 2014 213 579
Oct. 24, 2014 (DE) .................... 10 2014 221 684

(51) Int. Cl.
*H01M 10/613* (2014.01)
*H01M 10/6563* (2014.01)
(Continued)

(52) U.S. Cl.
CPC ..... *H01M 10/6563* (2015.04); *H01M 2/1077* (2013.01); *H01M 10/613* (2015.04);
(Continued)

(58) Field of Classification Search
None
See application file for complete search history.

(56) References Cited

U.S. PATENT DOCUMENTS 5,589,290 A * 12/1996 Klink .................. H01M 2/1077
429/159
6,411,063 B1 * 6/2002 Kouzu .................. B60L 3/0046
320/150
(Continued)

FOREIGN PATENT DOCUMENTS

DE 102007043947 3/2009
DE 102010032936 5/2012
(Continued)

OTHER PUBLICATIONS

International Search Report for Application No. PCT/EP2015/062848 dated Sep. 24, 2015 (English Translation, 3 pages).

*Primary Examiner* — Haroon S. Sheikh
(74) *Attorney, Agent, or Firm* — Michael Best & Friedrich LLP (57) ABSTRACT

The invention relates to a housing (10) for accommodating a plurality of battery cells (20), in particular lithium-ion battery cells, wherein the housing (10), in particular a plastic housing, comprises a cooling device with an inlet point (30) and an outlet point (40) for an air stream (22) for cooling the battery cells (20). In addition, the housing (10) is designed as a single piece together with the cooling device integrated in the housing (10), and the cooling device additionally has spacers (34; 34a, 34b) for arranging all accommodated battery cells (20) with an intermediate space (23) for guiding air between the battery cells (20), by which means an air
(Continued)

channel (25) is provided for the air stream (22) between the battery cells (20). The invention further relates to a battery pack (50) and to a motor vehicle comprising such a battery pack (50).

17 Claims, 6 Drawing Sheets

(51) Int. Cl.
    *H01M 2/10*     (2006.01)
    *H01M 10/625*     (2014.01)
    *H01M 10/6566*     (2014.01)
    *H01M 10/0525*     (2010.01)
    *H01M 10/6557*     (2014.01)

(52) U.S. Cl.
    CPC ..... *H01M 10/625* (2015.04); *H01M 10/6566* (2015.04); *H01M 2/1072* (2013.01); *H01M 10/0525* (2013.01); *H01M 10/6557* (2015.04); *H01M 2220/20* (2013.01); *Y02E 60/10* (2013.01); *Y02P 70/50* (2015.11)

(56) References Cited

U.S. PATENT DOCUMENTS

| | | | |
|---|---|---|---|
| 2004/0004461 A1* | 1/2004 | Hamada | H01M 2/1016 320/112 |
| 2006/0078786 A1 | 4/2006 | Wu | |
| 2006/0216852 A1 | 9/2006 | Suh et al. | |
| 2008/0124627 A1 | 5/2008 | Shimoyama | |
| 2009/0169978 A1 | 7/2009 | Smith et al. | |
| 2012/0009456 A1* | 1/2012 | Sohn | H01M 2/1077 429/120 |
| 2012/0088131 A1* | 4/2012 | Chung | H01M 2/1077 429/72 |
| 2012/0328916 A1* | 12/2012 | Enning | H01M 2/1077 429/72 |
| 2013/0149583 A1 | 6/2013 | Kurita | |

FOREIGN PATENT DOCUMENTS

| | | |
|---|---|---|
| DE | 102011080975 | 2/2013 |
| DE | 102013219452 | 4/2014 |
| JP | 2007172981 | 7/2007 |
| JP | 2012028207 | 2/2012 |

\* cited by examiner

FIG. 6

HOUSING FOR ACCOMMODATION OF A PLURALITY OF BATTERY CELLS HAVING A COOLING DEVICE INTEGRATED IN THE HOUSING

BACKGROUND OF THE INVENTION

The present invention relates to a housing for accommodation of a multiplicity of battery cells having a cooling device, a battery pack having a housing according to the invention, and a motor vehicle having a battery pack of this kind.

Li-ion battery systems are used as energy storage devices for the drive in hybrid and electric vehicles. They consist of a plurality of Li-ion battery cells, which are electrically interconnected in series and/or in parallel, are monitored by a battery management system and are integrated mechanically to give an overall system. The cells are preferably operated in a certain temperature window in order to ensure optimum performance, minimum aging and reliable operation.

For this purpose, the primary necessity is to dissipate the Joule heat arising during the operation of the cells, which can be described by the electric current and the internal resistance of the cell, and the system's reaction enthalpy arising from reversible chemical processes in the cell.

In many technical applications, heat is dissipated from the cells or modules with the aid of a liquid cooling system. For this purpose, the modules are, for example, mounted on plates, through which there is a flow of fluid and which are supplied with water/glycol mixtures or an evaporating refrigerant in accordance with the degree of cooling required. The disadvantages with these cooling options are, in particular, the relatively high outlay on apparatus and the number of necessary components required for integration into the vehicle. Particularly in the case of relatively small (low-voltage) battery systems, it may be advantageous to be independent of the heat management of the vehicle in order to obtain a certain flexibility in respect of the installation location and to allow standardization of the modules.

Air cooling is already known for this purpose at the present time. DE 10 2011 080 975 A1, for instance, discloses a battery cell stack for a battery module, which has prismatic battery cells, between which prismatic air channels are arranged. By means of these air channels, selective air routing between the battery cells is possible. It is furthermore proposed to introduce the battery cell stack, together with the air channels, into a corresponding battery housing and optionally to clamp them, i.e. the air channels are not formed as an integral component together with the battery housing and must therefore be fitted and mounted in a battery housing to form a battery cell housing with air channels.

Figure 1:
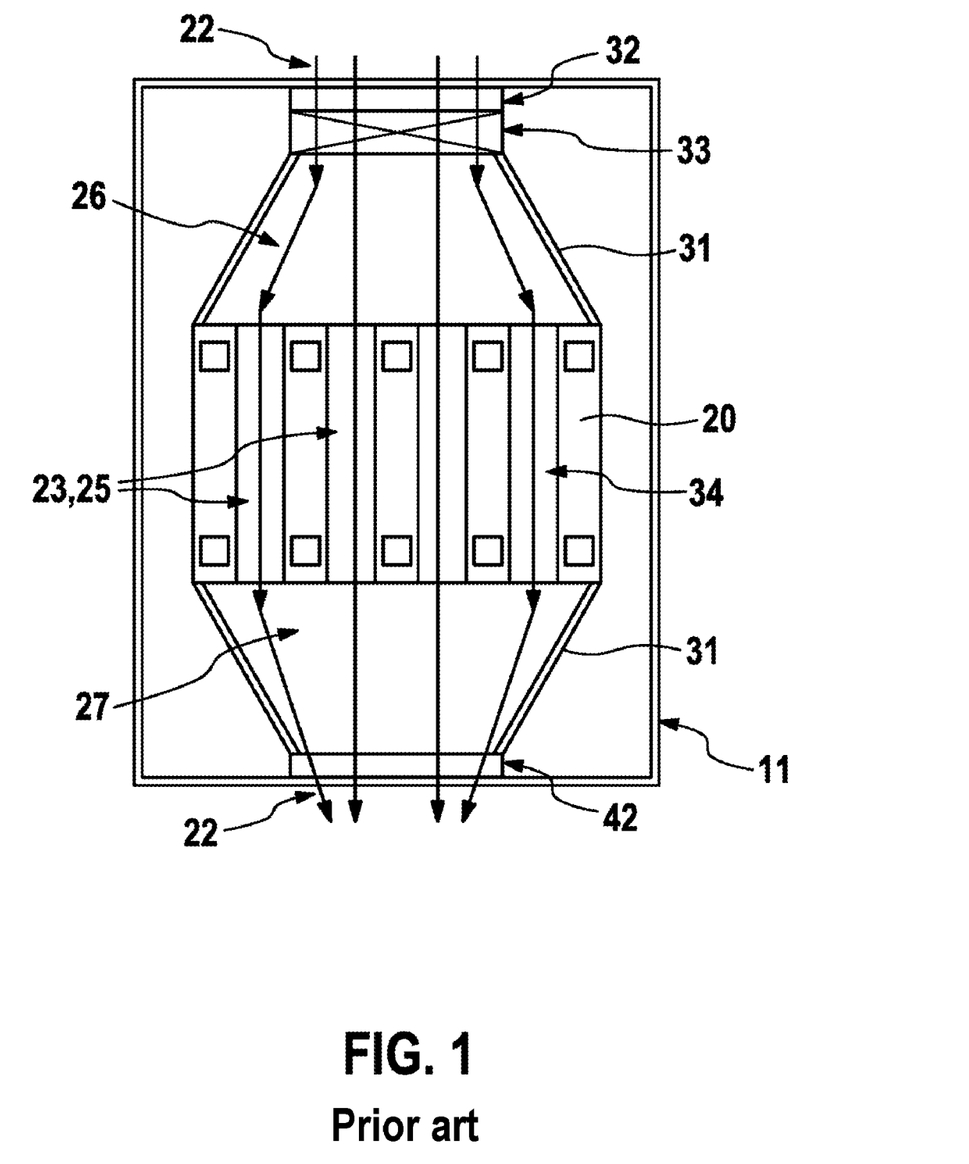
FIG. 1 shows an illustrative embodiment of a housing for battery cells having a device for air cooling from the prior art.

A battery cell housing of this kind is illustrated schematically by way of example in FIG. 1, i.e. a battery cell stack with air channels 25 between the individual battery cells 20 has been installed in an essentially separate battery cell housing 11. For this purpose, a likewise separate battery cell stack having a cooling device is constructed first of all. The intermediate spaces 23, through which air can be guided, between the battery cells 20 are formed by separate components, referred to as "spacers" 34. In addition, baffle plates 31 (also referred to as "air plenums") are used in many air cooled systems in order to distribute the air stream 22 uniformly between the battery cells 20. Finally, the cooling device, which, as a further preference, can comprise a fan 33, a distributor space 26, a collecting space 27 and air filters 32, 42, is mounted in a separate housing 11.

DE 10 2007 043 947 A1 furthermore describes a heat sink for battery cells, which has channels for cooling medium and can be produced from a single extruded section. In contrast, the heat sink does not include the inlets and outlets for the cooling medium. On the contrary, a first and a second covering cap are provided for this purpose in order to close the first and second end faces of the heat sink, said caps providing the required inlets and outlets for the cooling medium. It is proposed to secure the covering caps in a suitable manner on the heat sink, in particular to weld them to the heat sink.

Another cooling structure for batteries is presented in JP 2012-028207 A. To enable the batteries to be cooled by means of controlled air cooling, a flow control plate is provided in the cooling structure, being positioned upstream of the first row of battery cells, which are arranged in several rows. The flow control plate has openings for the air stream and thus allows the cooling air to flow through the flow control plate at desired locations. A flow control plate of this kind is arranged only in front of the batteries in the first row and does not simultaneously serve as a spacer for the batteries, in particular not for arranging the batteries with an intermediate space between the batteries.

Finally, US 2006/0216582 A1 discloses a housing for batteries, in which two openings for the inflow of the external air are provided in addition to cooling plates. However, the air fed to the housing is not passed between the battery cells but instead is intended for cooling the cooling plates. Thus, there is not an air channel provided in the intermediate space between the battery cells but cell boundary plates composed of materials of high thermal conductivity to enable as much heat as possible to be dissipated from the battery cells to the cooling plates.

In summary, a housing for battery cells which comprises a cooling device using an air stream is known in principle from the prior art. However, the known system configuration is, on the one hand, technically complex and, on the other hand, also economically disadvantageous for the following reasons: overall, a very large number of different parts is used, and these have first of all to be produced individually and subsequently assembled. More specifically, an essentially separate module or pack consisting of battery cells with a cooling device, such as spacers for the provision of an air channel between the battery cells, is first of all constructed. The overall battery cell pack is then, in turn, installed in an essentially separate housing.

There is therefore a need for a housing for battery cells which can be made available at low cost with a technically simple arrangement for reliable cooling of the battery cells by means of an air stream.

SUMMARY OF THE INVENTION

The housing according to the invention for accommodation of a multiplicity of battery cells comprises a cooling device with an inlet point and an outlet point for an air stream for cooling the battery cells. In this case, the housing is designed as an integral component together with the cooling device integrated in the housing. In addition, the cooling device has spacers for arranging all the battery cells to be accommodated with an intermediate space, through which air can be guided, between the battery cells, thereby making available to the air stream an air channel between the battery cells.

The housing embodiment according to the invention is based on the following insights: first of all, it was found that low-cost production of the housing with an air cooling device can be achieved if the number of separate components required for the overall housing is considerably reduced. In the best case, the entire housing is then formed as an integral component. It follows from this that as many parts of the cooling device as possible should be integrated into the integral housing, i.e. the housing with the integrated cooling device is produced in a single production step.

To enable the cooling device to achieve a reliable cooling effect, the necessary minimum requirements of the cooling device for achieving this have to be identified. It was furthermore found that a decisive factor for a reliable cooling effect, in addition to the housing openings fundamentally required for the air cooling of the battery cells, i.e. an inlet and an outlet point for the air stream, is that the cooling flow should be passed into the intermediate spaces between the battery cells. This recognition led to the inventive measure of providing the cooling device integrated into the housing with spacers for the arrangement of all the battery cells to be accommodated with an intermediate space, through which air can be guided, between the battery cells, whereby an air channel is provided for the air stream between the battery cells.

By means of the spacer required according to the invention, it is advantageously achieved that, on the one hand, reliable holding of the battery cells in the housing is made available and, on the other hand, a battery cell arrangement suitable for effective air cooling is simultaneously ensured. Thus, the spacer assumes not only a mechanical holding function but also makes a significant contribution to effective air cooling. The spacer can therefore be regarded as an essential part of the cooling device.

As a result, the battery cell housing made available according to the invention can be produced at an advantageously low cost and already comprises all the components required for reliable air cooling, and, in particular, does not require installation of separate components.

BRIEF DESCRIPTION OF THE DRAWINGS

Illustrative embodiments of the invention are explained in greater detail with reference to the drawings, in which.

DETAILED DESCRIPTION

Figure 2:
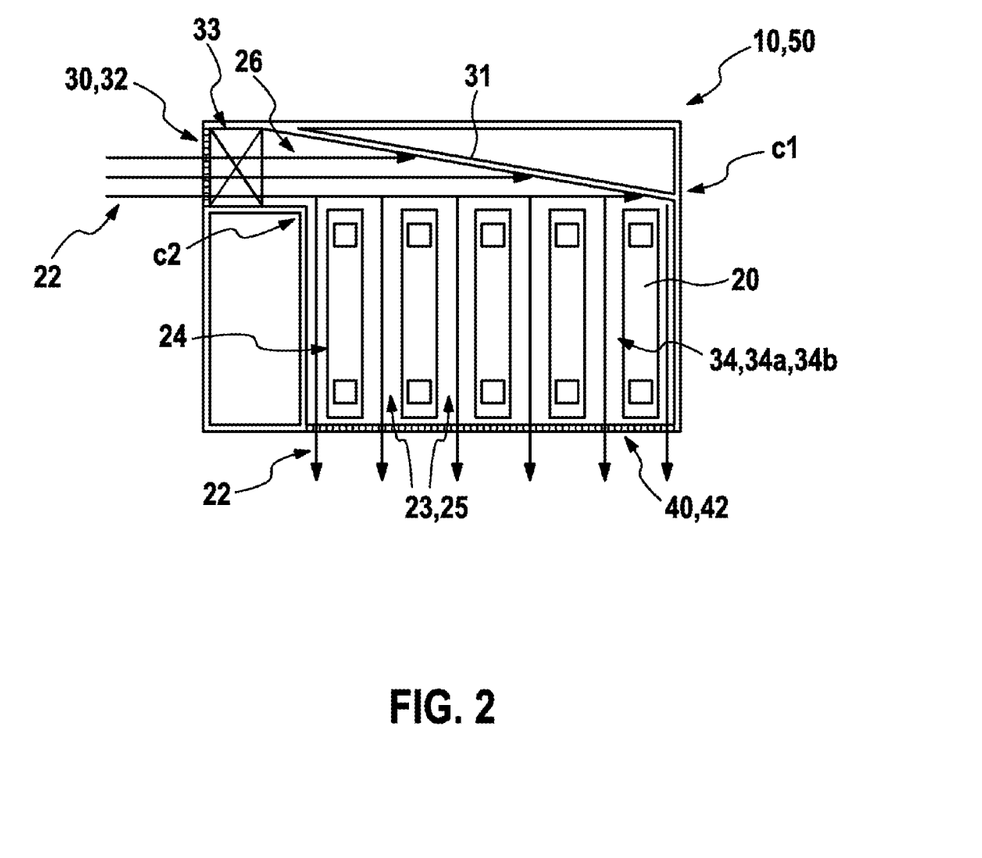
FIG. 2 shows a first illustrative embodiment of the housing according to the invention for battery cells having a device for air cooling in plan view.

A first illustrative embodiment of the housing according to the invention is explained with the aid of FIG. 2. Fundamentally, the invention makes available a housing 10 for accommodation of a multiplicity of battery cells 20, wherein the housing 10 comprises a cooling device having an inlet point 30 and an outlet point 40 for an air stream 22 for cooling the battery cells 20. The battery cells 20 can be formed by lithium-ion battery cells. The housing 10 is preferably a plastic housing. According to the invention, it is additionally required that the housing 10 is designed as an integral component together with the cooling device integrated in the housing 10. In this case, the cooling device additionally has spacers 34; 34a, 34b for the arrangement of all the battery cells 20 to be accommodated with an intermediate space 23, through which air can be guided, between the battery cells 20, thereby making available to the air stream 22 an air channel 25 between the battery cells 20. The spacer 34; 34a, 34b itself is not shown in FIGS. 2 and 4 for reasons of clarity; only the position thereof is indicated by the reference numeral 34; 34a, 34b.

In the embodiment of the invention shown in FIG. 2, the cooling device has a distributor space 26 for distributing the air stream 22, which is arranged after the inlet point 30 in the flow direction of the air stream 22. In the distributor space 26, the air stream 22 introduced into the housing 10 through the inlet point 30 is advantageously distributed between the battery cells 20 to be cooled. Owing to the distributor space 26, the air stream 22 thus advantageously does not necessarily already have to have a width or diameter required for cooling all the battery cells 20 in the battery cell stack at the inlet point 30. Accordingly, the inlet point 30 of the housing 10 can be of compact configuration, even in the case of a large battery cell stack. The air stream 22 has reached the necessary width at the latest as it leaves the distributor space 26.

For this purpose, the distributor space 26 can have at least one baffle plate 31 for guiding the air stream 22. In particular, the distributor space 26, as can be seen in FIG. 2, can be bounded at least in part by a baffle plate 31. Depending on requirements, however, it is also possible for a baffle plate 31 to be arranged within a distributor space 26. Thus, for example, the air stream 22 could be distributed or channeled in several directions at an early stage. Moreover, the term "baffle plate 31" in the present description should not be taken to be a reference to the component which restricts it to a certain material. The baffle plate 31 can also be constructed from nonmetallic materials in the housing 10 according to the invention. Thus, the baffle plate 31 can also be composed of a plastic.

It can furthermore be seen from FIG. 2 that the baffle plate 31 is arranged in such a way that the air stream 22 guided onto the baffle plate 31 is deflected by the baffle plate 31 parallel to the lateral surfaces 24 of the battery cells 20 to be accommodated. This measure is based on the recognition that the baffle plate 31 is suitable not only for simply distributing the air stream 22 between a plurality of battery cells 20 but also for selectively deflecting the air stream 22 in a direction parallel to the lateral surfaces 24 of the battery cells 20 to be accommodated. Deflection of the air stream 22 by a baffle plate 31 is particularly suitable when the deflected air stream 22 passes between the lateral surfaces 24 of the battery cells 20, i.e. the air stream 22 simultaneously cools two adjacent battery cells 20 as it flows through in the intermediate space 23 of the battery cells 20.

In the embodiment shown in FIG. 2, the air stream 22 runs parallel to the wide-area lateral surfaces 24 of the battery cells 20. Depending on requirements, however, the air stream 22 can also run parallel to the narrow-area lateral surfaces 24 of the battery cells 20. One possibility for this would be, for example, for each of the battery cells 20 to be arranged at an angle of 90° in comparison with the embodiment shown in FIG. 2.

Figure 3:
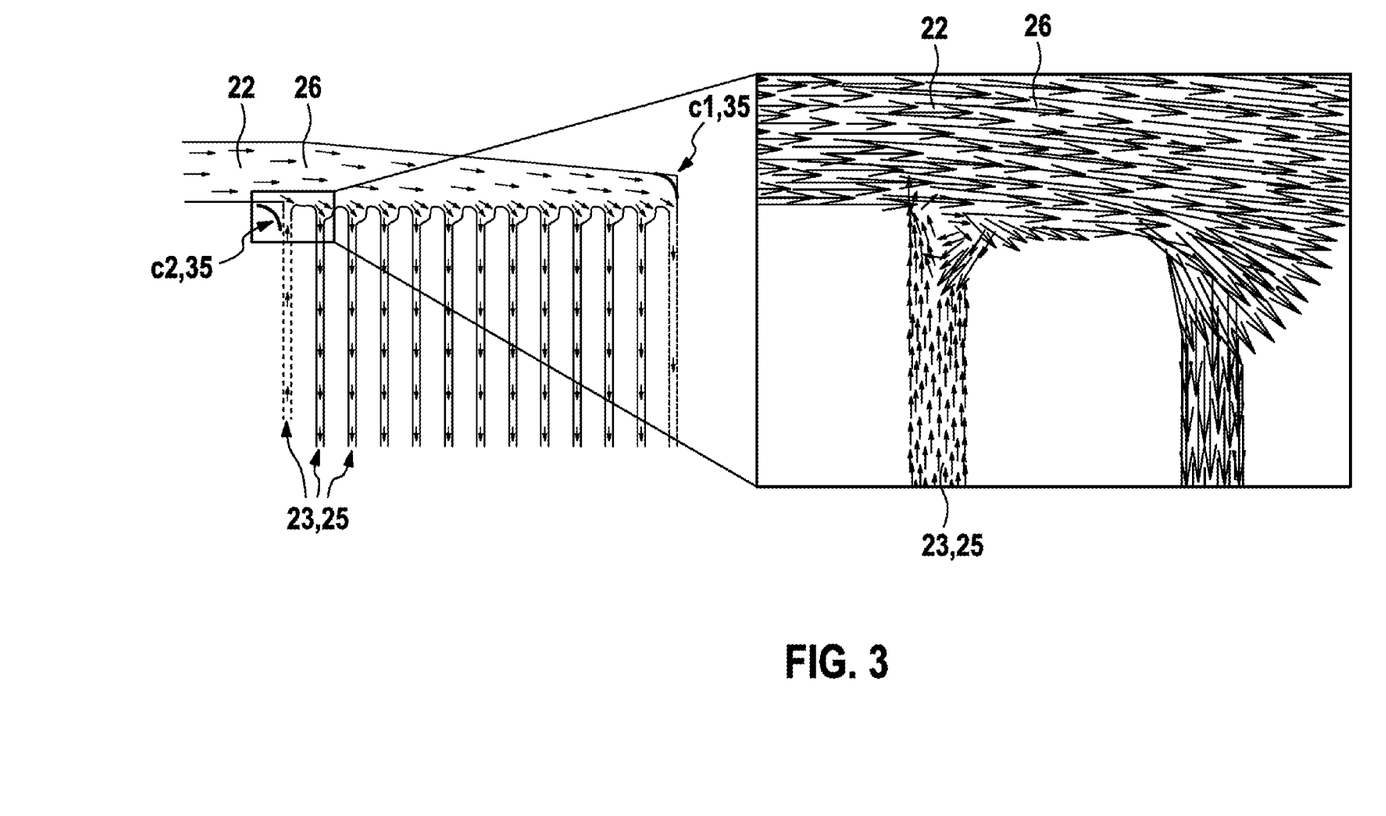
FIG. 3 shows two graphical illustrations of simulation results relating to the air flow.

In a development of the invention, provision is advantageously made for the distributor space 26 to have at least one corner c1, c2 with a rounded portion 35—as indicated in FIG. 3—for uniform distribution of the air stream 22. This measure is based on the recognition that the configuration of the corners c1, c2 in the distributor space 26 has an effect on the uniform distribution of the air stream 22. In FIG. 2, by way of example, the distributor space 26 does not have rounded corners c1, c2. In such cases, as the simulations in FIG. 3 show, there is the possibility that the air stream 22 will not flow uniformly through all the intermediate spaces 23 between the battery cells 20. In this case, the flow rate of the air stream 22 can be greater than 0 (zero) and less than or equal to 80 m³/h. The flow rate preferably has a value in the range of from 20 to 60 m³/h.

The left-hand illustration in FIG. 3 shows an overview of the strength (speed) of the air stream 22 in the distributor space 26 and in the air channels 25 between the battery cells 20 at a given constant supply of the cooling air in the absence of a rounded portion 35 at the corners c1, c2. The rectangular detail from the overview in the left-hand illustration is shown on an enlarged scale in the right-hand illustration. The small dashes or arrows depicted in the illustrations represent the distribution and strength of the air stream 22. The simulations show that the outer air channels 25, especially the first air channel 25 arranged at corner c2, is supplied with less of the air stream 22 than the inner air channels 25. A distributor space 26 having at least one corner c1, c2 with a rounded portion 35 therefore contributes to uniform distribution of the air stream 22.

In particular, it is proposed to provide at least one corner c1, c2 with a rounded portion 35 for guiding the air stream 22 into an air channel 25 at an end position. The at least one corner c1 with a rounded portion 35 can preferably be formed by a baffle plate 31 with a rounded portion 35 on the end region thereof.

In a development of the invention, the cooling device has at least one air filter 32, 42. The air filter 32, 42 can preferably be designed as an inlet point 30 and/or as an outlet point 40. This ensures that only a filtered, clean air stream 22 is introduced into the housing 10. As the outlet point 40, the air filter 42 prevents external air from entering the housing 10 unfiltered via the outlet point 40 under any circumstances, even when flowing cooling air is not present.

To intensify the air stream 22, the cooling device can have a fan 33. The fan 33 is preferably arranged adjacent to the inlet point 30. This ensures that the entire air stream 22 within the housing 10 is intensified.

Figure 4:
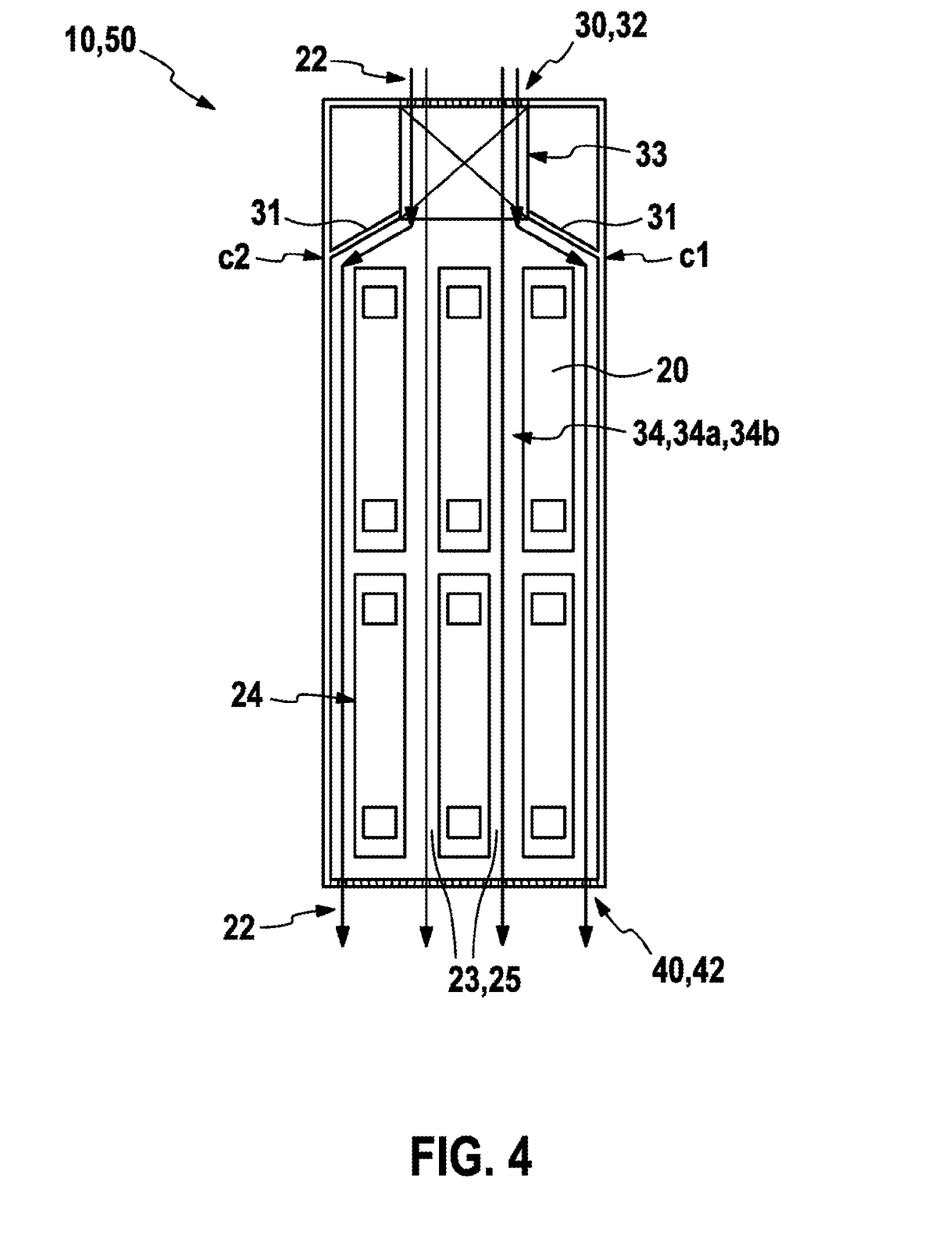
FIG. 4 shows a second illustrative embodiment of the housing according to the invention for battery cells having a device for air cooling in plan view.

The second illustrative embodiment of the housing 10 according to the invention for battery cells 20 shown in FIG. 4 shows a variant in which the battery cells 20 can be arranged not only adjacent to one another but also one behind the other. Thus, a plurality of battery cell stacks can be arranged in the housing 10. The housing 10 therefore has an elongate cuboidal shape. The reference signs in FIG. 4 furthermore have the same significance as in FIG. 2 (and as in the entire present application), and are therefore not described again here.

Another possibility, not shown in the figures, also consists in stacking the battery cells 20 one above the other. The external shape of the housing 10 can thus advantageously be produced in a manner adapted to the respective requirements without thereby deviating from the configuration according to the invention of the housing 10.

Figure 5:
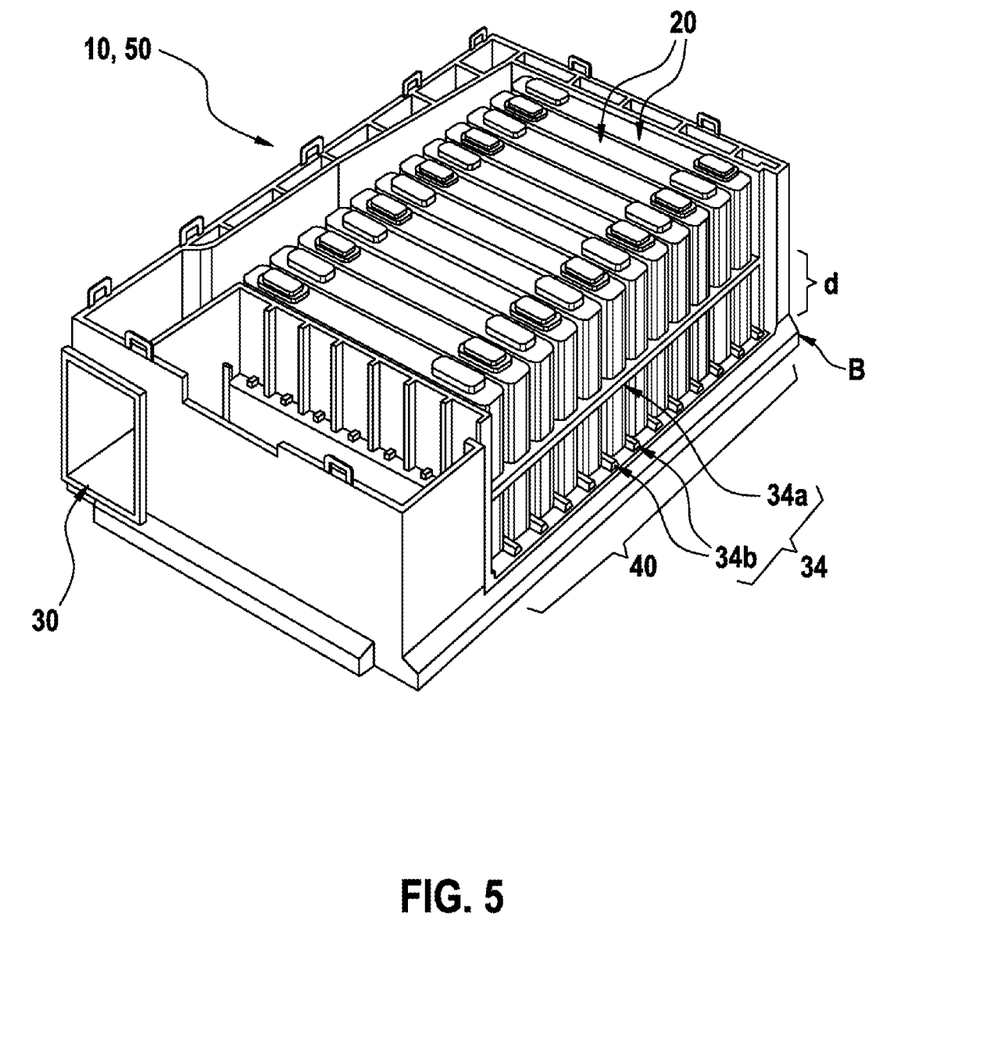
FIG. 5 shows a third illustrative embodiment of the housing according to the invention for battery cells having a device for air cooling in perspective view.

A third illustrative embodiment of the housing 10 according to the invention for battery cells 20 is shown in perspective view in FIG. 5. In this embodiment too, a housing 10 having a cooling device is first of all made available, wherein the cooling device comprises an inlet point 30 and an outlet point 40 for an air stream 22 for cooling the battery cells 20. Also shown in this FIG. 5 is the spacer 34; 34a, 34b, which is not shown in FIGS. 2 and 4 for reasons of clarity. In this embodiment, the spacer 34; 34a, 34b is formed in the housing 10 having a bottom surface B by an intermediate-level spacer 34a, which is arranged in a plane at a distance d from the bottom surface B. The distance d from the bottom surface B is chosen so that the intermediate-level spacer 34a fits around the battery cells 20 approximately in the middle thereof after they have been accommodated in the housing 10.

As an alternative or preferably in addition, the spacer 34; 34a, 34b is formed in the housing 10 having the bottom surface B by a bottom spacer 34b, which is arranged on the bottom surface B. The bottom spacer 34b provides the battery cells 20 with a defined arrangement in the housing 10, ensuring that an air channel 25 is formed between each of the battery cells 20 after they have been accommodated in the housing 10.

Although not envisaged and therefore not shown in the embodiment according to FIG. 5, the cooling device can, if required, have a collecting space 27 for collecting the air stream 22, which is arranged ahead of the outlet point 40 in the flow direction of the air stream 22.

It should once again be made clear at this point that all the parts of the cooling device, insofar as they are provided in a particular embodiment of the invention, are made available as integrated parts in the integral housing 10.

Figure 6:
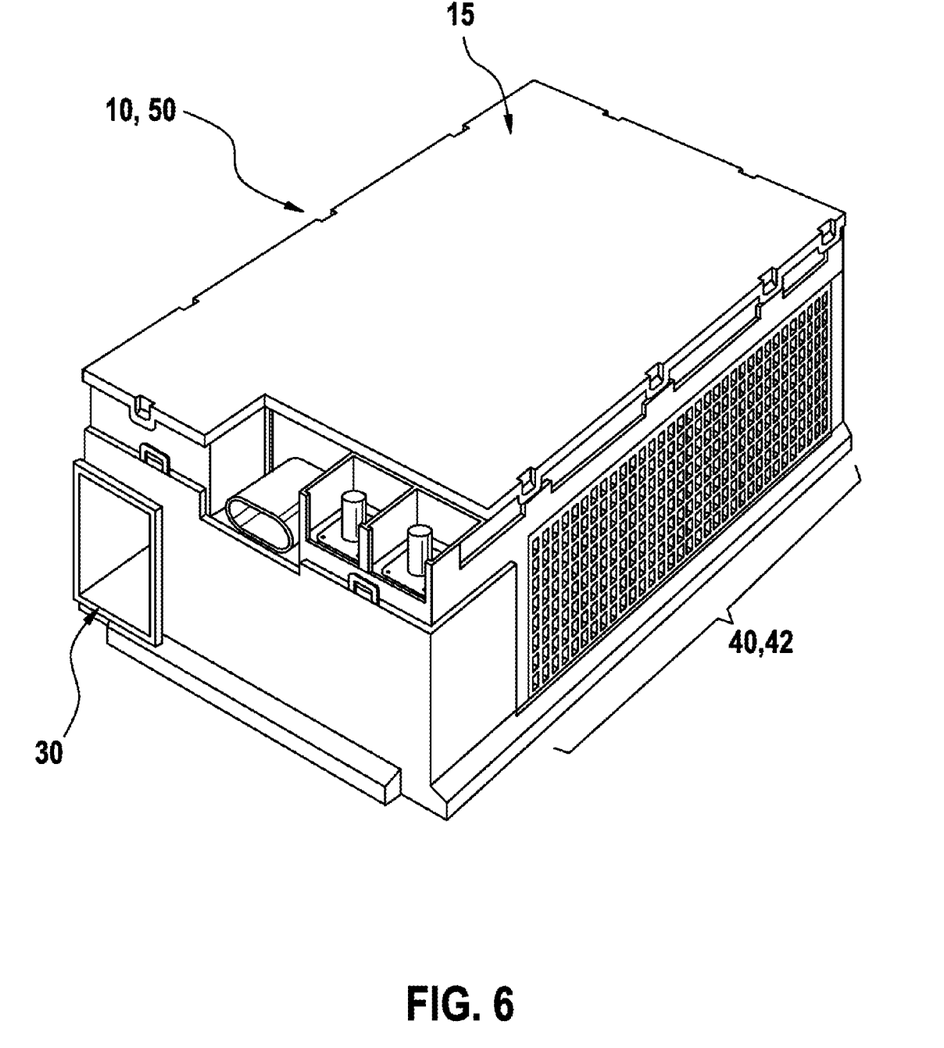
FIG. 6 shows a fourth illustrative embodiment of the housing according to the invention for battery cells having a device for air cooling in perspective view.

A battery pack 50 having a housing 10 according to the invention and battery cells 20 arranged therein is furthermore made available as a further subject matter of the invention. As shown in a further illustrative embodiment of the invention according to FIG. 6, the battery pack 50 can have a housing 10 which comprises a separate cover 15. The separate cover 15 is therefore not integrated in the integral housing 10. With the separate cover 15, the battery cells 20 arranged in the housing 10 are protected from external damaging influences from all sides. The cover 15 can preferably be fitted with electronic components. By way of example, the cover 15 can include electronic components which, as cell connectors, bring about electrical connection between the battery cells 20 after being placed on the housing 10.

The battery pack 50 according to the invention can be used or fitted for many different purposes. By way of example, it is proposed to provide a motor vehicle, in particular a motor vehicle that can be driven by electric motor, with a battery pack 50 according to the invention, wherein the battery pack 50 is connected to a drive system of the motor vehicle.

The invention claimed is:

1. A housing (10) for accommodation of a multiplicity of battery cells (20), wherein the housing (10) comprises a cooling device with an inlet point (30) and an outlet point (40) for an air stream (22) for cooling the battery cells (20), characterized in that the housing (10) is an integral component together with the cooling device integrated in the housing (10), wherein the cooling device additionally has spacers (34; 34a, 34b) for arranging all the battery cells (20) to be accommodated with an intermediate space (23), through which air can be guided, between the battery cells (20), thereby making available to the air stream (22) an air channel (25) between the battery cells (20), wherein the housing has a side wall with an inner surface, wherein a portion of the air channel is defined between the inner surface and one of the battery cells, wherein the cooling device has a distributor space (26) for distributing the air stream (22), wherein the distributor space is arranged after the inlet point (30) in the flow direction of the air stream (22), wherein the distributor space (26) is defined by a distributor space surface and at least one corner (c1, c2) with a rounded portion (35) for uniform distribution of the air stream (22), wherein the distributor space surface is planar until a point at which the distributor space surface terminates at the at least one corner, the at least one corner connecting the distributor space surface to the inner surface of the side wall, and wherein the rounded portion (35) of the at least one corner (c1, c2) is flush with the inner surface of the side wall and guides the air stream (22) into the portion of the air channel (25).

2. The housing (10) as claimed in claim 1, characterized in that the distributor space (26) has at least one baffle plate (31) for guiding the air stream (22).

3. The housing (10) as claimed in claim 2, characterized in that the baffle plate (31) is arranged in such a way that the air stream (22) guided onto the baffle plate (31) is deflected by the baffle plate (31) parallel to the lateral surfaces (24) of the battery cells (20) to be accommodated.

4. The housing (10) as claimed in claim 1, characterized in that the at least one corner (c1, c2) with a rounded portion (35) is formed by a baffle plate (31) with a rounded portion (35) in an end region thereof.

5. The housing (10) as claimed in claim 1, characterized in that the cooling device has at least one air filter (32, 42).

6. The housing (10) as claimed in claim 1, characterized in that the cooling device has a fan (33).

7. The housing (10) as claimed in claim 1, characterized in that the spacer (34; 34a, 34b) is formed in the housing (10) having a bottom surface (B) by an intermediate-level spacer (34a), which is arranged in a plane at a distance (d) from the bottom surface (B).

8. The housing (10) as claimed in claim 1, characterized in that the spacer (34; 34a, 34b) is formed in the housing (10) having a bottom surface (B) by a bottom spacer (34b), which is arranged on the bottom surface (B).

9. The housing (10) as claimed in claim 1, characterized in that the cooling device has a collecting space (27) for collecting the air stream (22), which is arranged ahead of the outlet point (40) in the flow direction of the air stream (22).

10. The housing as claimed in claim 1, wherein the battery cells (20) are lithium-ion battery cells, and wherein the housing (10) is a plastic housing.

11. The housing (10) as claimed in claim 2, characterized in that the baffle plate (31) is arranged in such a way that the air stream (22) guided onto the baffle plate (31) is deflected by the baffle plate (31) between the lateral surfaces (24) of the battery cells (20) to be accommodated.

12. The housing (10) as claimed in claim 1, characterized in that the cooling device has at least one air filter (32, 42) designed as the inlet point (30) and/or as then outlet point (40).

13. The housing (10) as claimed in claim 1, characterized in that the cooling device has a fan (33) arranged adjacent to the inlet point (30).

14. A battery pack (50) having a housing (10) as claimed in claim 1 and battery cells (20) arranged therein.

15. The battery pack (50) as claimed in claim 14, characterized in that the housing (10) has a separate cover (15) having electronic components.

16. The battery pack (50) as claimed in claim 14, characterized in that the housing (10) has a separate cover (15).

17. A motor vehicle, having a battery pack (50) as claimed in claim 14, wherein the battery pack (50) is connected to a drive system of the motor vehicle.

\* \* \* \* \*